(12) United States Patent
Gidden et al.

(10) Patent No.: US 7,743,590 B1
(45) Date of Patent: Jun. 29, 2010

(54) DRIVE ADAPTER FOR RIDING LAWNMOWER

(75) Inventors: Keith Gidden, Travelers Rest, SC (US); Douglas Lloyd Glass, Travelers Rest, SC (US)

(73) Assignee: Liquid Combustion Technology, Inc., Travelers Rest, SC (US)

( * ) Notice: Subject to any disclaimer, the term of this patent is extended or adjusted under 35 U.S.C. 154(b) by 0 days.

(21) Appl. No.: 12/499,920

(22) Filed: Jul. 9, 2009

Related U.S. Application Data

(60) Provisional application No. 61/134,446, filed on Jul. 10, 2008.

(51) Int. Cl.
*A01D 34/00* (2006.01)

(52) U.S. Cl. .......................................... 56/13.7

(58) Field of Classification Search .................. 56/1, 56/11.8, 12.7, 13.5, 13.7, 16.8, 16.9; 172/14, 172/15, 40, 42
See application file for complete search history.

(56) References Cited

U.S. PATENT DOCUMENTS

| 4,242,855 A | * | 1/1981 | Beaver, Jr. ................... 56/13.7 |
| 5,560,189 A | * | 10/1996 | Devillier et al. .............. 56/13.6 |
| 6,675,562 B2 | * | 1/2004 | Lawrence ........................ 56/2 |
| 7,415,823 B2 | * | 8/2008 | Iwaki et al. ................... 60/487 |

* cited by examiner

*Primary Examiner*—Robert E Pezzuto
(74) *Attorney, Agent, or Firm*—J. Bennett Mullinax, LLC

(57) ABSTRACT

An accessory drive attachment is provided. The accessory drive attachment may be attached to a lawnmower that has a hydrostatic transmission. The transmission system of the lawnmower may be used to drive a shaft of the accessory drive attachment. An accessory such as a leaf blower, air compressor, pressure washer, or electric generator may be attached to the accessory drive attachment and driven by the shaft.

7 Claims, 10 Drawing Sheets

DRIVE ADAPTER FOR RIDING LAWNMOWER

RELATED APPLICATIONS

This application claims the benefit of U.S. Application Ser. No. 61/134,446 filed on Jul. 10, 2008 and which is incorporated herein by reference.

FIELD OF THE INVENTION

The present invention relates generally to accessory drive attachments. More particularly, the present application involves an accessory drive attachment that may be attached to a lawnmower for use in driving various accessories such as a leaf blower, air compressor, pressure washer, or electric generator.

BACKGROUND

Residential and commercial establishments make use of items such as pressure washers, air compressors, leaf blowers, electrical generators, water pumps and trash pumps. These items include their own individual engine for use in driving one or more portions of the device so that they can function for their intended purpose. Inclusion of multiple individual engines in various items located within a residential or commercial setting requires a large amount of maintenance. For example, all of the various engines must be provided with appropriate oil changes, air filter replacements, fuel stabilizer additions, and repairs at various service centers. Aside from the time and cost of such maintenance, the ability to properly maintain so many different engines may be problematic as they each require their own separate maintenance schedule and instructions.

Also, the use of various items that have individual engines necessarily increases the cost, size and weight of the particular item. Compromises are made by the manufacture in the selection of an appropriate engine for a particular device. As such, the device may have certain undesirable features such as a smaller horsepower engine or a pull start mechanism. Further, certain individual engines on devices have complicated starting procedures and are often difficult to quickly actuate. Individual engines on items found in home or commercial settings may possibly generate greater emissions and be less fuel efficient due to their small size. Finally, items that incorporate individual engines may have a small fuel capacity due to the size of the fuel tank associated with the engine. These items may thus require frequent fueling and may run out of fuel at locations remote from a fuel source. As such, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGS. in which.

Figure 1:
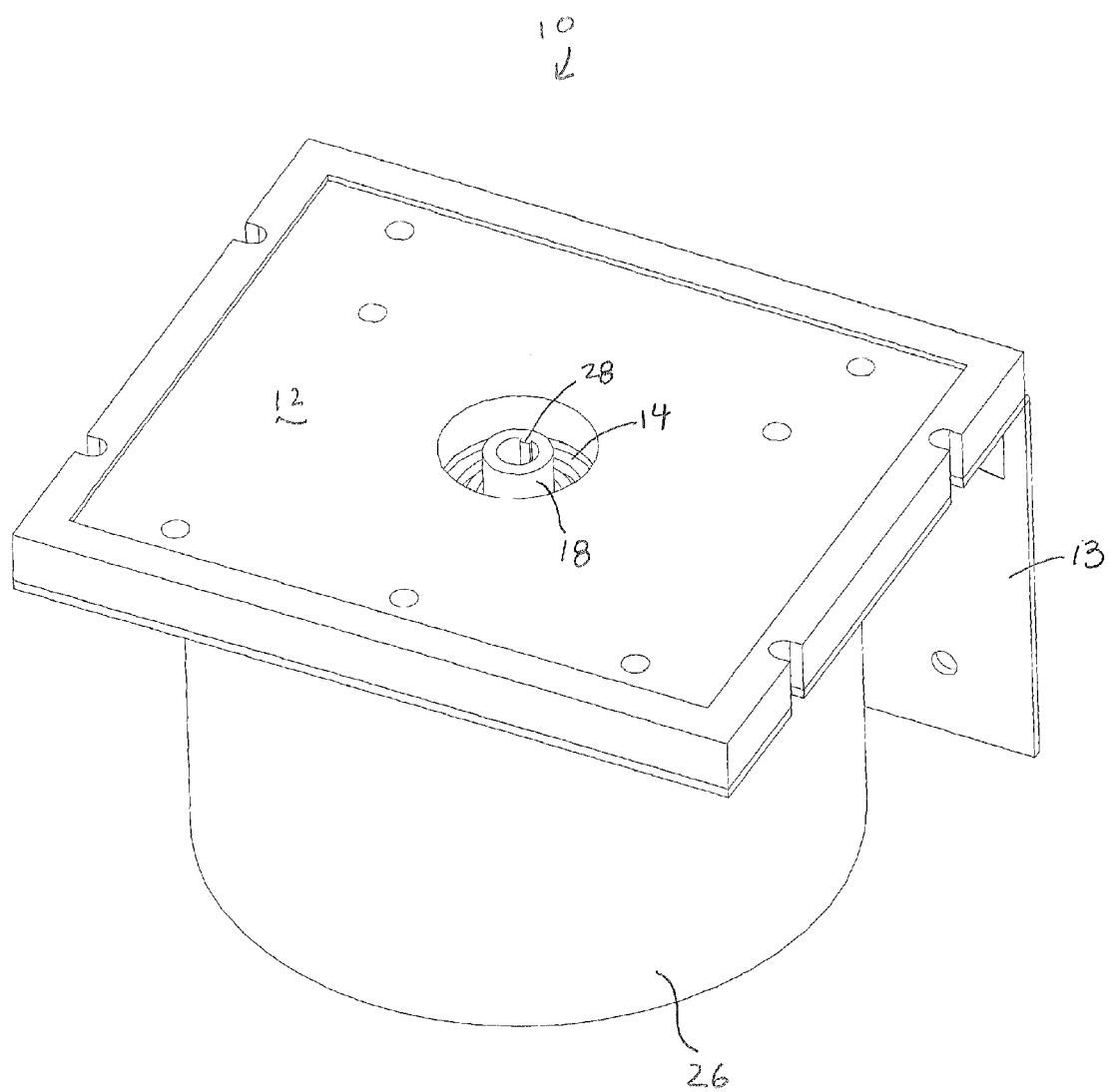
FIG. 1 is a perspective view of an accessory drive attachment in accordance with one exemplary embodiment of the present invention.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for an accessory drive attachment 10 that may act as an engine for use in driving a number of accessories 34 such as a pressure washer, a generator, a leaf blower, a trash pump, or an air compressor. The accessory drive attachment 10 can be arranged so that the various accessories 34 can be attached thereon and driven so that a driving engine is not necessary in the various accessories 34 thus resulting in cost and labor savings. The accessory drive attachment 10 can be attached to a lawnmower 32 that features a hydrostatic transmission 40. The lawnmower 32 can be used to drive the accessory drive attachment 10 so that the accessory drive attachment 10, in turn, can drive the various accessories 34.

FIG. 1 illustrates an accessory drive attachment 10 in accordance with one exemplary embodiment. The accessory drive attachment 10 has an application mounting plate 12 to which the various accessories 34 can be mounted. The accessories 34 can be mounted to the application mounting plate 12 in a number of different manners. For example, the accessories 34 may be attached through the use of snap fit engagements or mechanical fasteners in accordance with various exemplary embodiments. The application mounting plate 12 may have one or more holes capable of receiving studs or bolts that in turn function to effect attachment of the accessories 34 thereon. The accessories 34 can be connected to the application mounting plate 12 through connections that allow the accessories 34 to be attached, detached, and changed out in a matter of minutes.

A mounting bracket 13 is attached to the application mounting plate 12 and may be L-shaped in accordance with one exemplary embodiment. The mounting bracket 13 is capable of being attached to a lawnmower 32 so that the accessory drive attachment 10, in turn, is likewise attached to the lawnmower 32. The mounting bracket 13 may have a series of apertures capable of receiving bolts or other mechanical fasteners for use in attachment to the lawnmower 32. However, it is to be understood that other means of attachment are possible. For example, the mounting bracket 13 can be welded to the lawnmower 32 or the lawnmower 32 and accessory drive attachment 10 can be integrally formed with one another so that the accessory drive attachment 10 is an integral component of the lawnmower 32 and not an add-on option.

The application mounting plate 12 and the mounting bracket 13 each have an aperture defined therein so that a shaft 18 can be accessed. The shaft 18 may be connected to a shaft or other transmission component of the accessory 34. The shaft 18 is capable of rotating so that this rotation is in turn transmitted to the accessory 34 to drive a desired component of the accessory 34 and in effect act as its engine. For example, the shaft 18 may rotate and be attached to a pressure washer 34 so that rotation of the shaft 18 is translated within the pressure washer 34 into compression on the water dispensed by the pressure washer 34 during a cleaning operation. In this manner, the pressure washer 34 need not be supplied with its own independent engine but can instead be driven by the accessory drive attachment 10.

Figure 2:
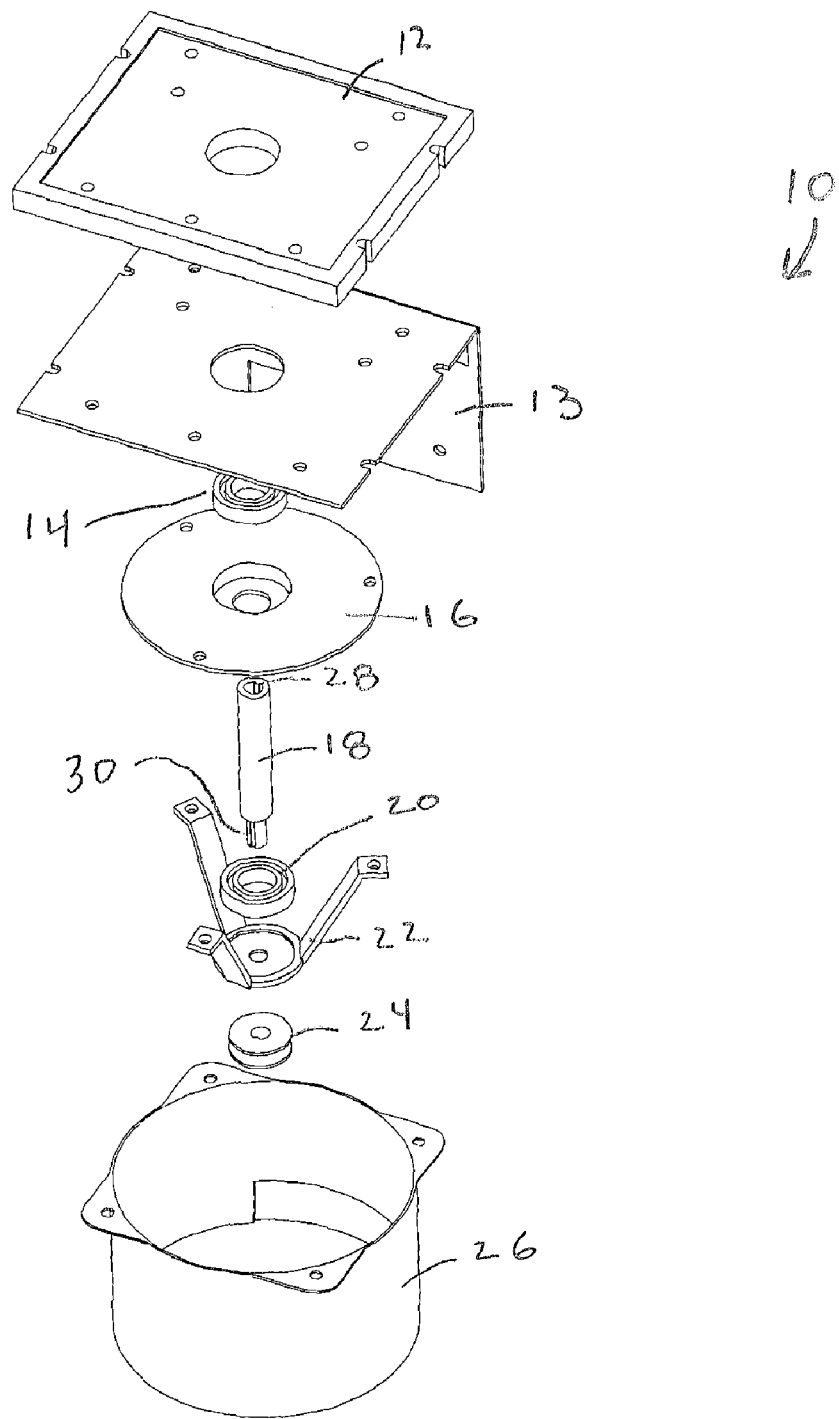
FIG. 2 is an exploded assembly view of the accessory drive attachment of FIG. 1.
Figure 3:
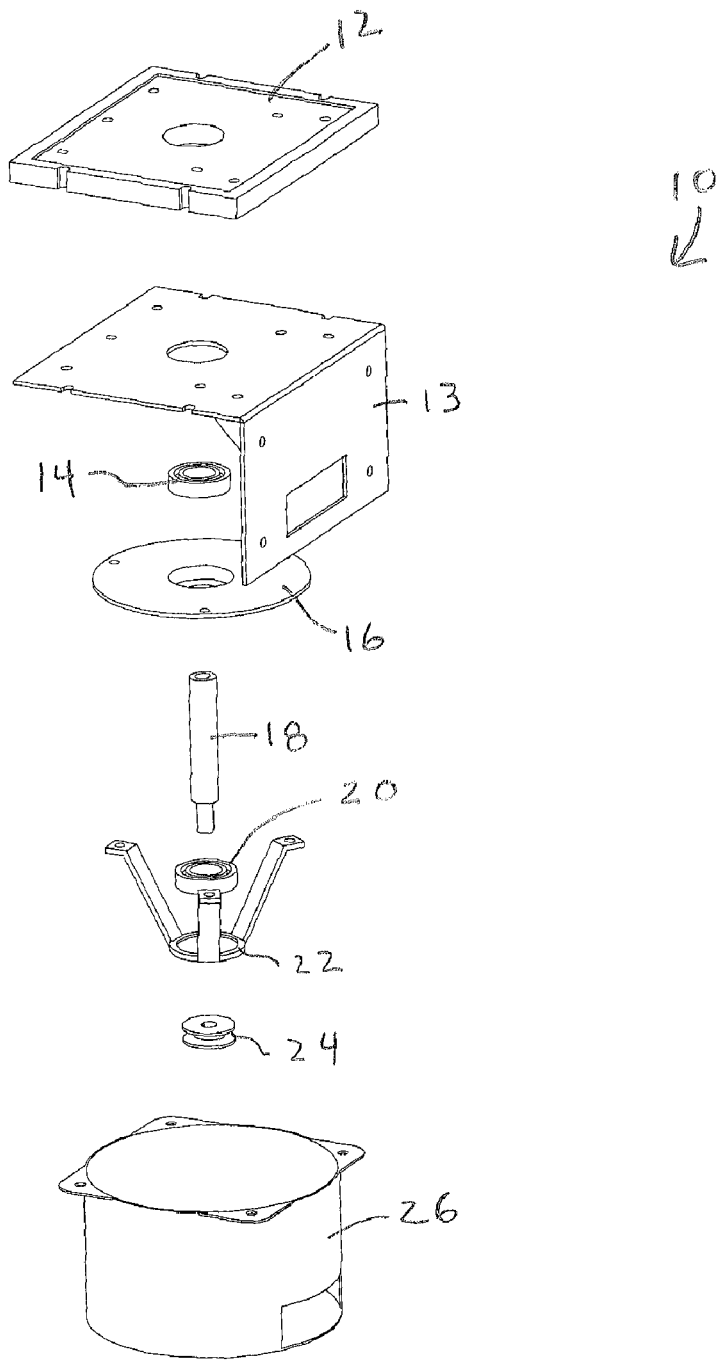
FIG. 3 is an exploded assembly view of the accessory drive attachment of FIG. 1 shown at a different angle than the view of FIG. 2.
Figure 4:
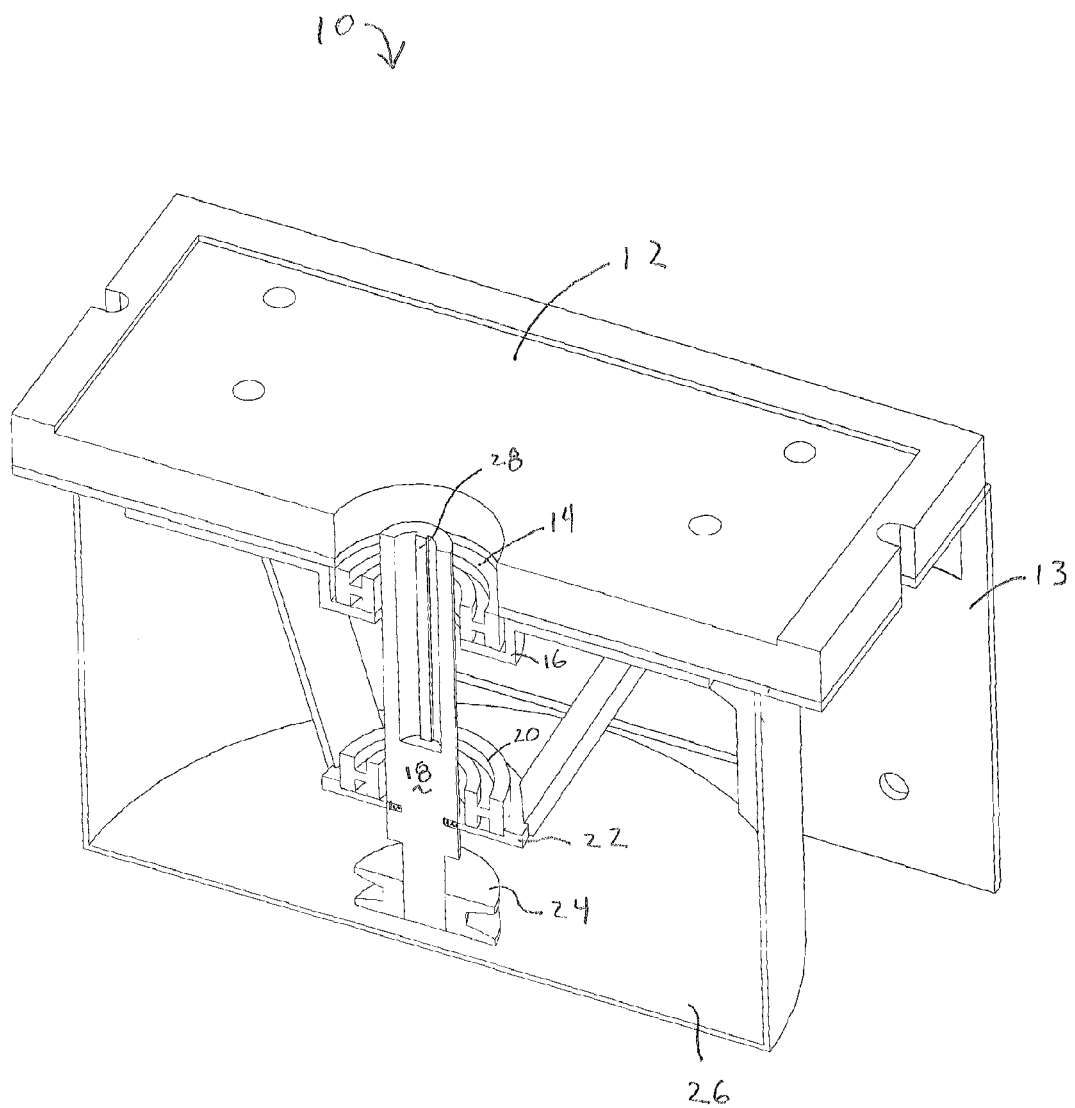
FIG. 4 is a cross-sectional view of the accessory drive attachment of FIG. 1.

With reference now to FIGS. 2-4, various internal features of the accessory drive attachment 10 are described. The shaft 18 is held by a first bearing 14 and a second bearing 20 that function to allow the shaft 18 to rotate. The first bearing 14 and second bearing 20 can be roller bearings and/or thrust bearings in accordance with certain exemplary embodiments. The first bearing 14 is contained within a first bearing support bracket 16 that acts to hold the outer portion of the first bearing 14 stationary. The first bearing support bracket 16 is mounted to a bottom of the top portion of the mounting plate 13. Bolts may be used to effect this attachment or the two components can be integrally formed in accordance with certain exemplary embodiments. A second bearing support bracket 22 is mounted to the bottom of the first bearing support bracket 16 and functions to hold the outer portion of the second bearing 20 stationary. The second bearing support bracket 22 thus acts to mount the second bearing 20 within the accessory drive attachment 10.

The accessory drive attachment 10 also includes an accessory drive attachment pulley 24. The accessory drive attachment pulley 24 is attached to the bottom of the shaft 18 so that a rigid connection is formed between these two components. As such, rotation of the accessory drive attachment pulley 24 causes rotation of the shaft 18 with the aid of bearings 14 and 20 within the accessory drive attachment 10. The accessory drive attachment pulley 24 may be driven by a belt extending from the lawnmower 32. The belt can enter the accessory drive attachment 10 through openings defined in the mounting bracket 13 and an attachment cover 26 as shown. The attachment cover 26 has four flanges with apertures for use in attachment to the mounting bracket 13. Various components of the accessory drive attachment 10 are housed and protected within a cavity defined by the attachment cover 26.

Figure 5:
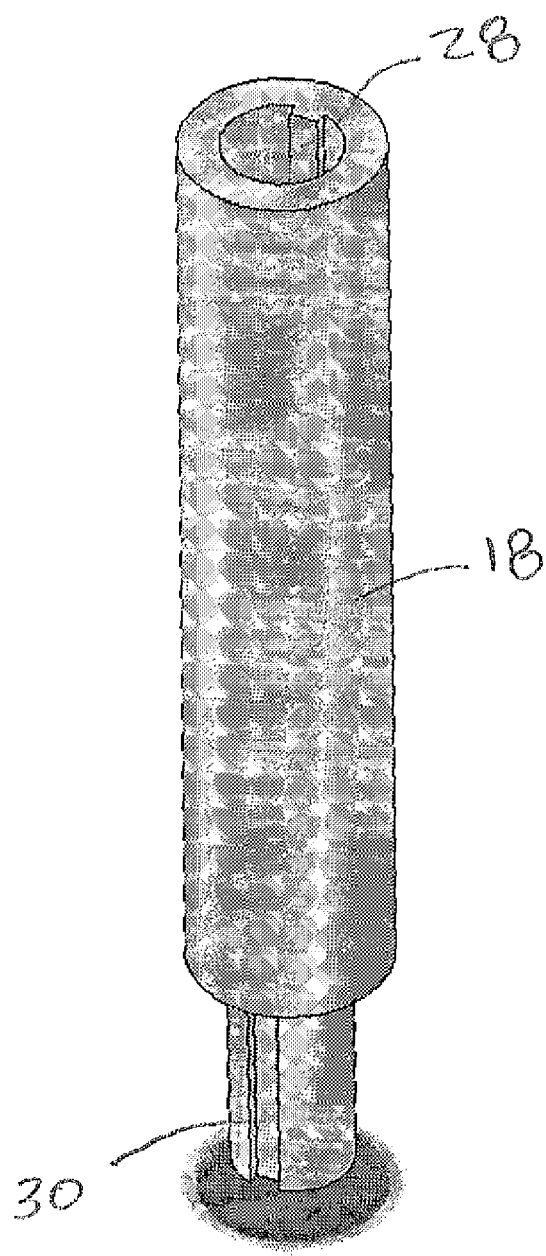
FIGS. 5-7 are perspective views of a shaft of the accessory drive attachment of FIG. 1 at different angles.
Figure 6:
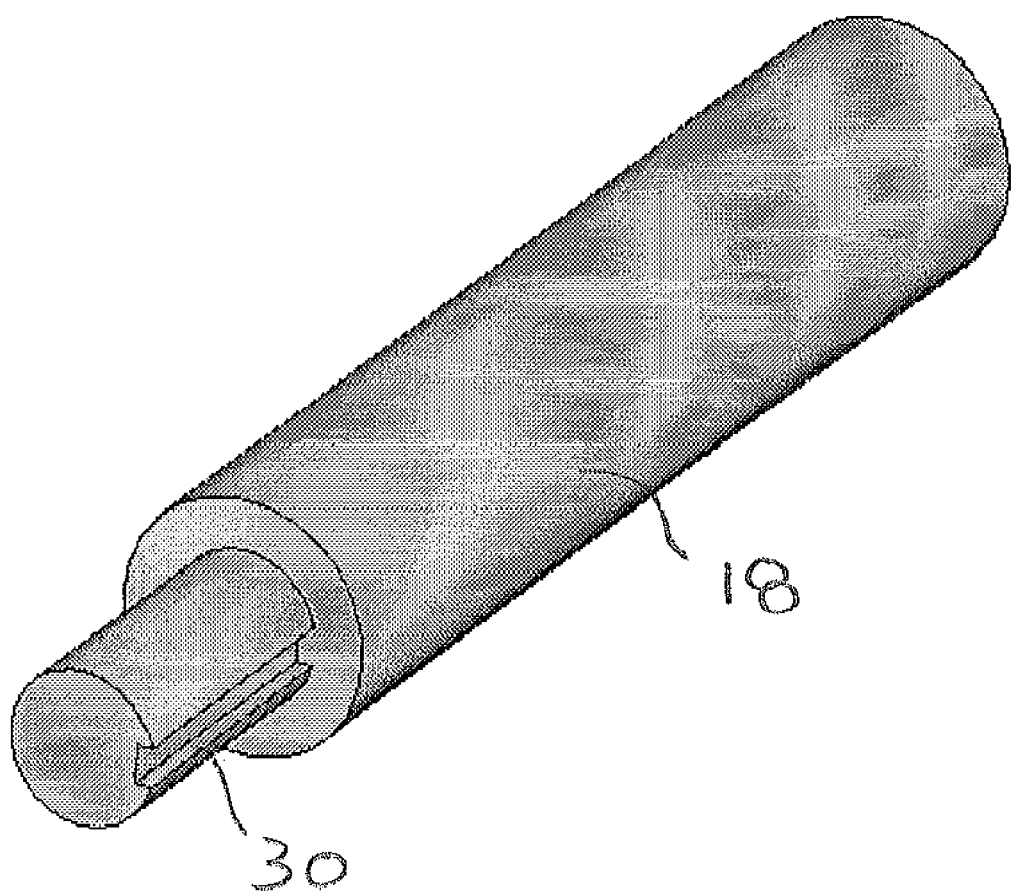
Figure 7:
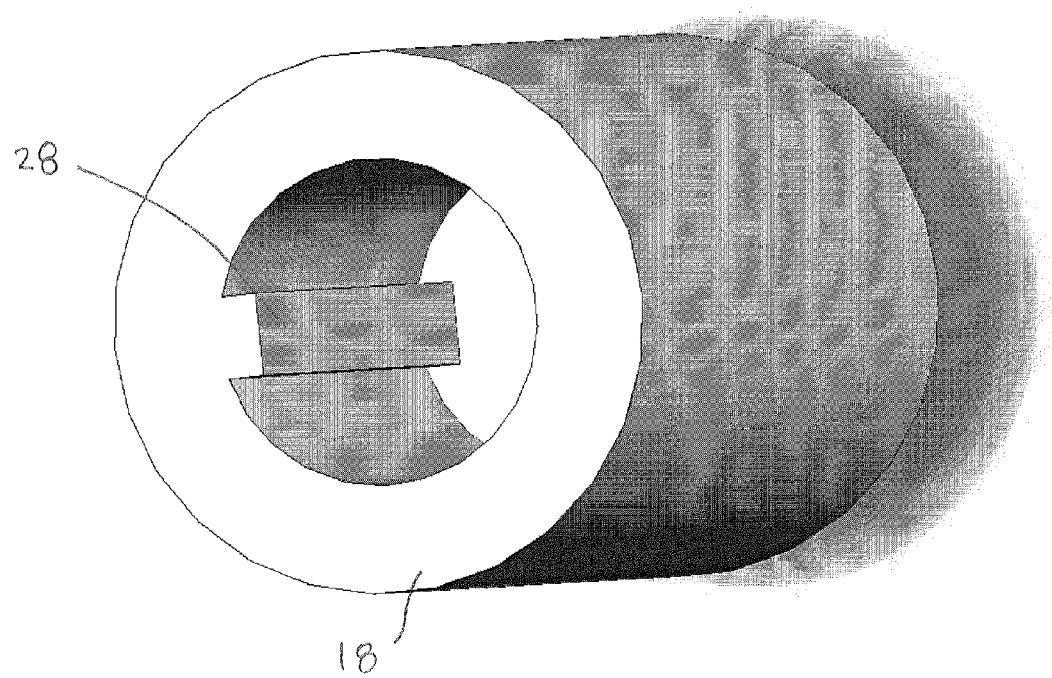

FIGS. 5-7 illustrate the shaft 18. As shown, the shaft 18 is generally cylindrical in shape and has two sections that each have different diameters. The section with the smaller diameter is a generally solid cylinder with a channel 30 defined on its outer surface that extends along the axis of shaft 18. The channel 30 receives a corresponding key or other projection of the accessory drive attachment pulley 24 so that the shaft 18 and accessory drive attachment pulley 24 can be rigidly attached to one another. The section of the shaft 18 with the larger diameter has a hollow interior that is opened on its upper end. The hollow interior is generally circular and has a key 28 that is rectangular in shape and extends along the axis of the shaft 18. The key 28 projects towards the interior of the shaft 18. A corresponding component of the accessory 34 can be mated to the key 28 and the interior portion of the shaft 18 to effect attachment to the shaft 18. However, it is to be understood that other forms of attachment to the shaft 18 are possible. For example, the accessory 34 may have a portion that attached to the outer circumference of the shaft 18. In this regard, a key may be present on the outer circumference of the shaft 18 to assist in attachment.

Figure 8:
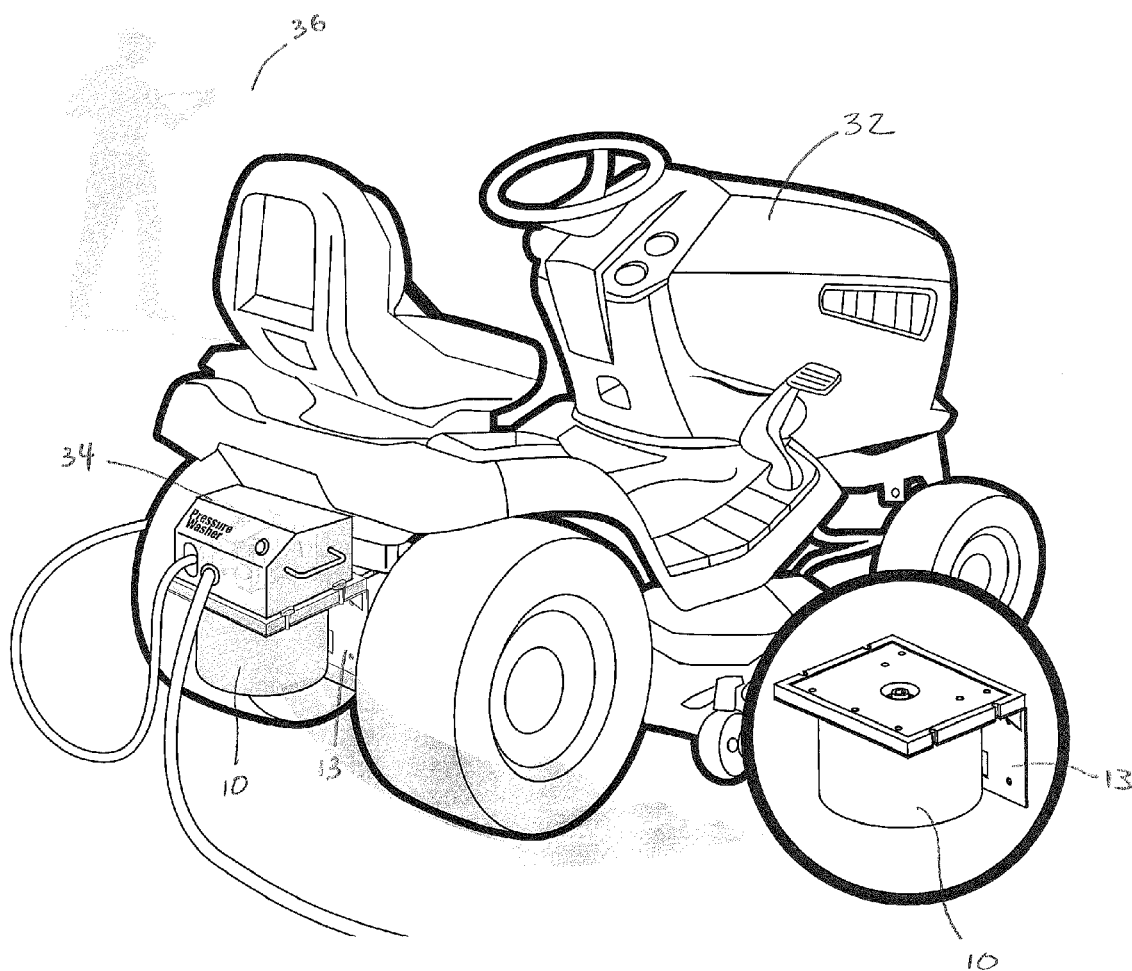
FIG. 8 is a perspective view of a lawnmower with an accessory drive attachment and an associated, attached accessory in accordance with one exemplary embodiment.

FIG. 8 illustrates the accessory drive attachment 10 as incorporated into the lawnmower 32. The mounting bracket 13 is attached to the rear of the lawnmower 32 so that the application mounting plate 12 presents a planar surface under and rearward of a seat of the lawnmower 32. The accessory 34 can be attached to the application mounting plate 12 and may be driven by the shaft 18 so that the accessory drive attachment 10 functions as an engine to the accessory 34. In the illustrated embodiment, a user may hold an applicator 36 of the accessory 34 to spray water compressed through actuation of the accessory drive attachment 10 with respect to other transmission components within the accessory 34.

The accessory drive component 10 can be used to drive various types of accessories 34. The accessory 34 may be a 3000 psi/2.8 gpm pressure washer in accordance with one exemplary embodiment. The accessory 34 may also be an 8000 continuous Watt/10,000 surge Watt electric generator. Another accessory 34 that can be attached to and driven by the accessory drive component 10 may be a 3 inch trash pump. Further, the accessory 34 may be a 250 mph commercial grade leaf blower in accordance with other exemplary embodiments. Also, a 120 psi single stage air compressor can be utilized as one of the accessories 34 in other versions. Still other accessories 34 may be envisioned in accordance with other exemplary embodiments. For example, the accessory 34 may be a water pump, a weed cutter, an edger, a concrete mixer, a snow blower, a tiller, a cleaning brush, a chipper or a mulcher in accordance with other exemplary embodiments.

The accessory drive component 10 eliminates the need to have multiple engines for multiple applications. The accessories 34 can thus be made smaller and lighter due to their lack of an engine to result in space savings and easier use and handling. Cost savings are also realized as the need to maintain multiple engines that are used sporadically or seasonally are eliminated. A single engine of the lawnmower 32 may only need to be maintained instead of multiple engines so that the amount of oil changes, air filter replacements, fuel stabilizer additions, and repairs is appropriately reduced.

Further, the use of a lawnmower 32 with an electric start allows the accessories 34 to likewise be started through the use of an electric start so that the need to pull start the various accessories 34 is eliminated. Additionally, the mobility of the lawnmower 32 can be utilized so that a user does not have to manually move the accessories 34 to a desired location. Typically, the accessories 34 use an engine that has a horsepower that is 50% of the rated horsepower of the lawnmower 32. As such, the use of the lawnmower 32 to drive the accessories 34 typically results in greater output power than in the instances in which the accessories 34 would otherwise utilize their own individual engines. Additionally, the lawnmower 34 generally has a larger gas tank than those present on accessories 34 having individual engines. In most instances, the lawnmower 34 may provide up to 150% more run time for most accessories 34 incorporated therein through the use of the accessory drive attachment 10 than if individual engines are utilized. Further, a large horsepower lawnmower 32 engine is generally more fuel efficient than smaller accessory 34 engines and may result in 30% less fuel consumption. In other embodiments, the use of the accessory drive attachment 10 may save from 20% to 40% in fuel consumption than in instances in which individual engines are utilized. Also, the use of a large horsepower lawnmower 32 engine may operate at less load than individual accessory 34 engines so that less engine stress results and fewer emissions are generated.

Figure 9:
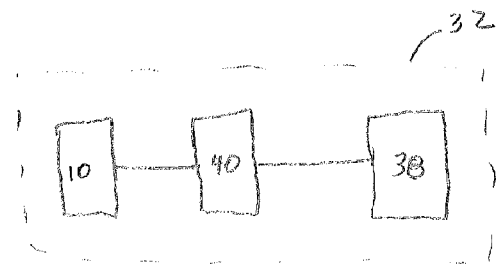
FIG. 9 is a schematic view of a transmission system of a lawnmower that incorporates an accessory drive attachment in accordance with one exemplary embodiment.

The accessory drive attachment 10 may be driven by a lawnmower 32 that has a hydrostatic transmission 40. FIG. 9 illustrates one exemplary embodiment in which the hydrostatic transmission 40 is driven by an engine 38 of the lawnmower 32. The accessory drive attachment 10 may be driven by the hydrostatic transmission 40. In this regard, the accessory drive attachment 10 may be driven by an output of the hydrostatic transmission 40 or may be driven by a transmission portion of the lawnmower 32 that is associated with the hydrostatic transmission 40. For example, a transmission portion of the lawnmower 32 may be used as an input to drive the hydrostatic transmission 40. The accessory drive attachment 10 can be integrated into this input portion of the transmission of the lawnmower 32. However, it is to be understood that the accessory drive attachment 10 need not be incorporated into a lawnmower 32 that employs a hydrostatic transmission 40 in accordance with other exemplary embodiments. In this regard, the accessory drive attachment 10 may be driven by a lawnmower 32 that lacks a hydrostatic transmission 40.

The hydrostatic transmission 40 functions to accept rotary power translated from the engine 38 and transmit this energy to a load having its own operating characteristics. During this process, the hydrostatic transmission 40 may regulate the speed of rotation, direction of rotation, and transmitted torque. As such, the speed and direction of the output of the hydrostatic transmission 40 may be varied while the engine 38 operates at a constant speed. The hydrostatic transmission 40 includes a hydraulic pump driven by the engine 38 which drives a hydraulic motor which is connected to the driven load. A variable displacement pump or motor may be used in order to regulate the output speed, torque and direction. The hydrostatic transmission 40 may thus transmit power hydraulically without the need for a solid coupling between the input and the output. One example of a hydrostatic transmission 40 incorporated into a lawnmower 32 may be found in U.S. Pat. No. 5,367,861 whose contents are incorporated by reference herein, in their entirety, for all purposes. The accessory drive attachment 10 may be incorporated into the lawnmower 32 disclosed in U.S. Pat. No. 5,367,861.

Figure 10:
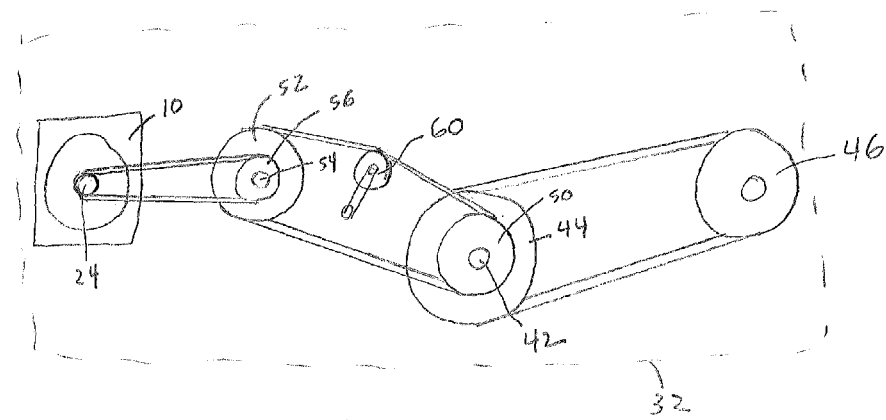
FIG. 10 is a top schematic view of a drive train of a lawnmower that incorporates an accessory drive attachment in accordance with one exemplary embodiment.
Figure 11:
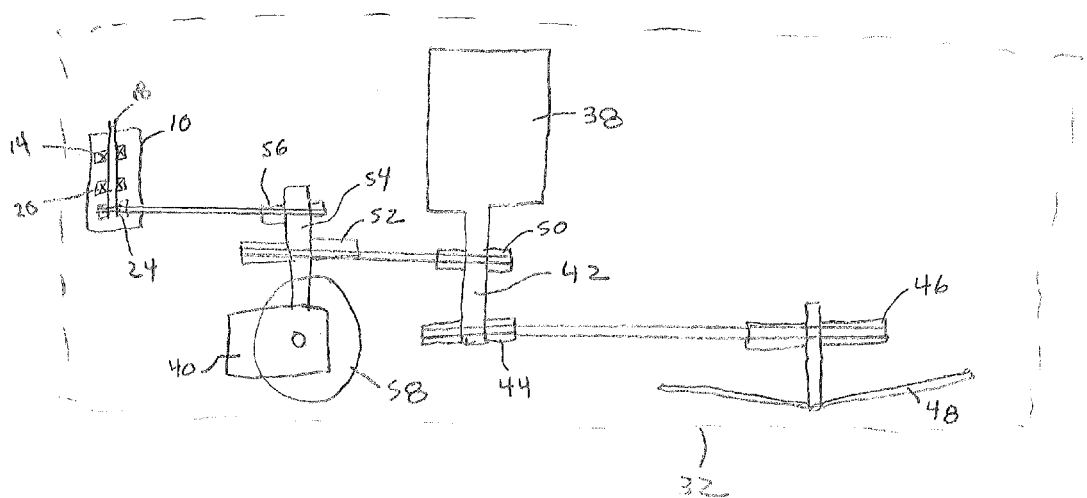
FIG. 11 is a side schematic view of the drive train of FIG. 10 that shows additional elements of the assembly.

FIGS. 10 and 11 show a drive train of a lawnmower 32 in accordance with one exemplary embodiment that is used to drive the accessory drive attachment 10. The lawnmower 32 includes an engine 38 that rotates an engine shaft 42. The engine shaft 42 can be attached to the engine 38 through the use of a coupling and can be mounted within the lawnmower 32 through the use of bearings or other members. A blade pulley 44 is rigidly attached to the engine shaft 42 and rotates therewith. A second blade pulley 46 is mounted to the lawnmower 32 and is tied into the blade pulley 44 through the use of a belt. Rotation of the blade pulley 44 causes rotation of the blade pulley 46 which in turn causes rotation of the lawnmower blade 48 that is rigidly attached to a shaft extending from the blade pulley 46. The lawnmower blade 48 is present for use in the cutting of grass by the lawnmower 32.

A hydrostatic transmission pulley 50 is also rigidly attached to the engine shaft 42. As such, rotation of the engine shaft 42 causes a corresponding rotation of the hydrostatic transmission pulley 50. A second hydrostatic transmission pulley 52 is in-line with the hydrostatic transmission pulley 50 and is in communication therewith by a belt. A tension mechanism 60 is present in order to provide desired tension to the belt linking hydrostatic transmission pulleys 50 and 52. Rotation of the hydrostatic transmission pulley 50 is communicated to the hydrostatic transmission pulley 52 to cause its rotation. A hydrostatic transmission pulley input shaft 54 is rigidly attached to the hydrostatic transmission pulley 52 so that shaft 54 rotates upon rotation of pulley 52. Rotation of the hydrostatic transmission pulley input shaft 54 is input into a hydrostatic transmission 40. The input to hydrostatic transmission 40 is converted as desired by the hydrostatic transmission into an output capable of turning the lawnmower wheels 58.

A pulley 56 is also rigidly attached to the hydrostatic transmission pulley input shaft 54 and rotates therewith. Pulley 56 is connected to the accessory drive attachment pulley 24 by way of a belt so that rotation of pulley 56 is communicated to the accessory drive attachment pulley 24 to effect rotation of the accessory drive attachment pulley 24. Rotation of the accessory drive attachment pulley 24 causes rotation of shaft 18. This rotation may be transmitted to the accessory 34 attached to the accessory drive attachment 10 to thus function as its engine.

The system can operate so that the engine 38 can run while the lawnmower 32 is in a neutral position so that the lawnmower wheels 58 do not turn and the lawnmower 32 remains stationary. The accessory drive attachment 10 can thus be run so that the accessories 34 can be powered while the lawnmower 32 is in neutral and does not move. With reference to FIG. 11, the engine 38 can run at a constant speed to thus effect rotation of the hydrostatic transmission pulley input shaft 54 to consequently drive the accessory drive attachment 10 and the associated accessories 34. The hydrostatic transmission 40 can receive the rotational input from the hydrostatic transmission pulley input shaft 54 but not output any rotation. In this manner, the wheels 58 will not turn while the engine 38 and accessory drive attachment 10 are both run. Another feature may be incorporated to allow the accessory drive attachment 10 to be selectively turned on and off. For example, a clutch or other mechanism may be included to allow the pulley 56 to selectively engage the hydrostatic transmission pulley input shaft 54 so that the accessory drive attachment 10 can be turned on or off while the engine 38 continuously runs.

Figure 12:
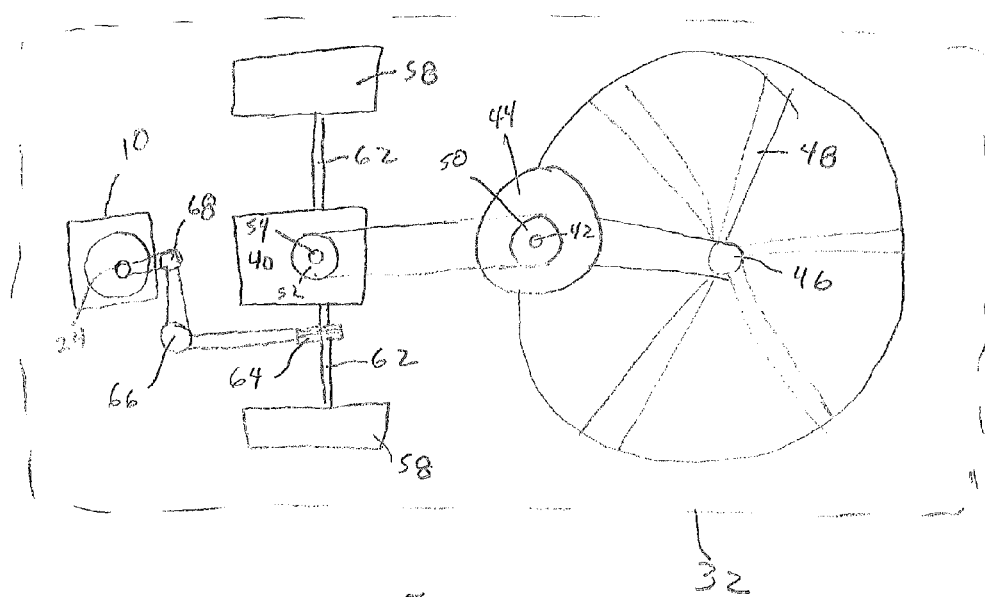
FIG. 12 is a top schematic view of a drive train of a lawnmower that incorporates an accessory drive attachment in accordance with another exemplary embodiment.

An alternate arrangement of the accessory drive attachment 10 is shown with reference to FIG. 12. The arrangement illustrated in FIG. 12 is similar to the previously discussed system in FIGS. 10 and 11. However, the accessory drive attachment pulley 24 is not driven off of a pulley 56 connected to the hydrostatic transmission pulley input shaft 54. In the embodiment of FIG. 12, input to the hydrostatic transmission 40 via the hydrostatic transmission pulley input shaft 54 is translated into output rotation of a pair of hydrostatic transmission output shafts 62 as desired. The lawnmower wheels 58 are attached to the hydrostatic transmission output shafts 62 and may rotate forwards or backwards at a regulated speed as desired upon output from the hydrostatic transmission 40. A pulley 64 is rigidly attached to one of the hydrostatic transmission output shafts 62 and rotates therewith. Pulley 64 is in communication with a transmission member 66 that functions to change the direction of rotation input from pulley 64. Rotation output of pulley 64 is thus changed via the transmission member 66. A second transmission member 68 is in communication with the transmission member 66 and likewise changes the direction of rotation output from the transmission member 66. Rotation from the transmission member 68 is translated to the accessory drive attachment pulley 24 to thus effect rotation of shaft 18 and hence cause the accessory drive attachment 10 to function as an engine to the accessories 34. The transmission members 66 and 68 can be variously configured in accordance with different exemplary embodiments and function to change the direction of rotation input thereto. The illustrated transmission system is arranged so that the accessory drive attachment 10 is driven based upon output from the hydrostatic transmission 40.

The system illustrated in FIG. 12 can be arranged so that the engine 38 is capable of being run in order to drive the accessory drive attachment 10 while the lawnmower wheels 58 do not turn. In this regard, the hydrostatic transmission output shaft 62 may rotate while the engine 38 runs so that the pulley 64 turns to result in driving of the accessory drive attachment 10. Clutches or other devices can be incorporated so that the lawnmower wheels 58 are selectively placed into communication with the hydrostatic transmission output shafts 62. As such, the lawnmower 32 can be placed into a neutral position while the lawnmower wheels 58 do not turn yet the accessory drive attachment 10 operates to drive the accessories 34. Other arrangements are also possible. For example, a clutch or other mechanism may be used to allow the accessory drive attachment 10 to be selectively activated. In this manner, some portion of the transmission between the accessory drive attachment 10 and the hydrostatic transmission output shaft 62 can be engaged and disengaged so that the accessory drive attachment 10 can be turned on or tuned off as desired while the engine 38 continuously runs.

Although shown and described with respect to a lawnmower 32 that is a riding lawnmower, it is to be understood that the accessory drive attachment 10 can be incorporated into a lawnmower 32 that is not a riding lawnmower. For example, the lawnmower may be a push lawnmower or a self-propelled lawnmower. Further, the accessory drive attachment 10 need not be incorporated into a lawnmower 32 in accordance with other exemplary embodiments. For example, the accessory drive attachment 10 may be incorporated into any device having a hydrostatic transmission 40 in accordance with other exemplary embodiments. The accessory drive attachment 10 may be incorporated into a forklift or may be incorporated into a stand-alone piece of machinery that has a hydrostatic transmission 40.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed:

1. An accessory drive attachment, comprising:
   an application mounting plate configured for having an accessory mounted thereon;
   a shaft configured for rotating with respect to the application mounting plate, wherein the shaft is configured for engaging the accessory mounted to the application mounting plate for use in driving the accessory, wherein the application mounting plate has an aperture disposed therethrough for the shaft to allow the shaft to engage the accessory when the accessory is mounted onto the application mounting plate; and
   a pulley engaging the shaft, wherein the pulley is capable of being rotated by a transmission of a lawnmower, wherein the pulley is located below the application mounting plate such that the application mounting plate is located between the pulley and the accessory that is mounted to the application mounting plate.

2. The accessory drive attachment as set forth in claim 1, wherein the accessory is selected from the group consisting of a pressure washer, an electric generator, a trash pump, a leaf blower, an air compressor, and a water pump, wherein the shaft has an opening on one end that extends along a portion of the axial distance of the shaft, and further comprising:
   an attachment cover having an interior, wherein the pulley is located in the interior of the attachment cover;
   a mounting bracket located between the attachment cover and the application mounting plate;
   a first bearing engaging the shaft;
   a first bearing support bracket attached to the mounting plate and engaging the first bearing;
   a second bearing engaging the shaft and located in the interior of the attachment cover; and
   a second bearing support bracket attached to the first bearing support bracket and engaging the second bearing.

3. A hydrostatic transmission drive unit configured for powering interchangeable accessories, comprising:
   an application mounting plate having an aperture;
   a hydrostatic transmission;
   a shaft driven by the hydrostatic transmission;
   a pressure washer mounted onto the application mounting plate, wherein the aperture of the application mounting plate is arranged so as to allow the shaft to be placed into communication with the pressure washer such that the hydrostatic transmission drives the shaft which in turn drives the pressure washer, wherein the application mounting plate, the hydrostatic transmission, the shaft, and the pressure washer are all components of a riding lawnmower.

4. A riding lawnmower, comprising:
   a hydrostatic transmission; and
   an accessory drive attachment configured for driving an accessory, wherein the accessory drive attachment comprising:
      an application mounting plate having an aperture, wherein the application mounting plate has a plurality of mounting apertures to allow the accessory to be attached to the application mounting plate;
      a shaft positioned with respect to the aperture of the application mounting plate so as to allow the shaft to be placed into communication with the accessory, wherein the accessory can be removed from the application mounting plate and a second, different accessory is attached through use of the plurality of mounting apertures to the application mounting plate to allow the shaft to be placed into communication with the second, different accessory for use in driving the second, different accessory.

5. The riding lawnmower as set forth in claim 4, wherein the accessory drive attachment is driven by the hydrostatic transmission.

6. The riding lawnmower as set forth in claim 4, wherein the accessory drive attachment is driven by an engine of the riding lawnmower.

7. The riding lawnmower as set forth in claim 4, wherein the accessory is selected from the group consisting of a pressure washer, an electric generator, a trash pump, a leaf blower, an air compressor, and a water pump.

* * * * *